C. J. MALINGS.
RESILIENT VEHICLE WHEEL.
APPLICATION FILED NOV. 18, 1912.

1,084,648.

Patented Jan. 20, 1914.

Witnesses
Jos. J. Hosler.
E. P. Schlosser.

Inventor
Charles J. Malings

By
Obed E. Dillman, Attorney

COLUMBIA PLANOGRAPH CO., WASHINGTON, D. C.

UNITED STATES PATENT OFFICE.

CHARLES J. MALINGS, OF EASTHAMPTON, MASSACHUSETTS.

RESILIENT VEHICLE-WHEEL.

1,084,648.  Specification of Letters Patent.  Patented Jan. 20, 1914.

Application filed November 18, 1912. Serial No. 731,921.

*To all whom it may concern:*

Be it known that I, CHARLES J. MALINGS, a citizen of the United States, residing at Easthampton, in the county of Hampshire and State of Massachusetts, have invented certain new and useful Improvements in Resilient Vehicle-Wheels, of which the following is a specification.

My invention relates to improvements in vehicle wheels, the primary object of the invention being to provide a generally improved resilient or spring wheel for use in connection with various forms of vehicles, the present embodiment being particularly designed and adapted for use as a wheel for motor trucks, automobiles, and other self-propelled vehicles.

A further object is to improve upon the construction of the "resilient vehicle wheel" disclosed and claimed in Patent No. 871,351, issued to me November 19th, 1907, in which a series of telescoping spring resisted spoke members are pivotally connected to the hub and felly portions of the wheel.

A still further object is to provide an improved driving hub for carrying and supporting the pivotally mounted inner or hub members of the telescoping spring resisted spokes and for bracing the latter as against lateral or circumferential disarrangement under the varying exigencies of actual service.

A still further object is to provide improved mountings and connections between the spring resisted telescoping spoke members and the hub and felly members, and also provide means for cushioning and limiting the circumferential movements between the driving hub and pivotally mounted spring resisted spoke members, whereby to take up and cushion the relative circumferential movements between the hub and felly members of the wheel during operation.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
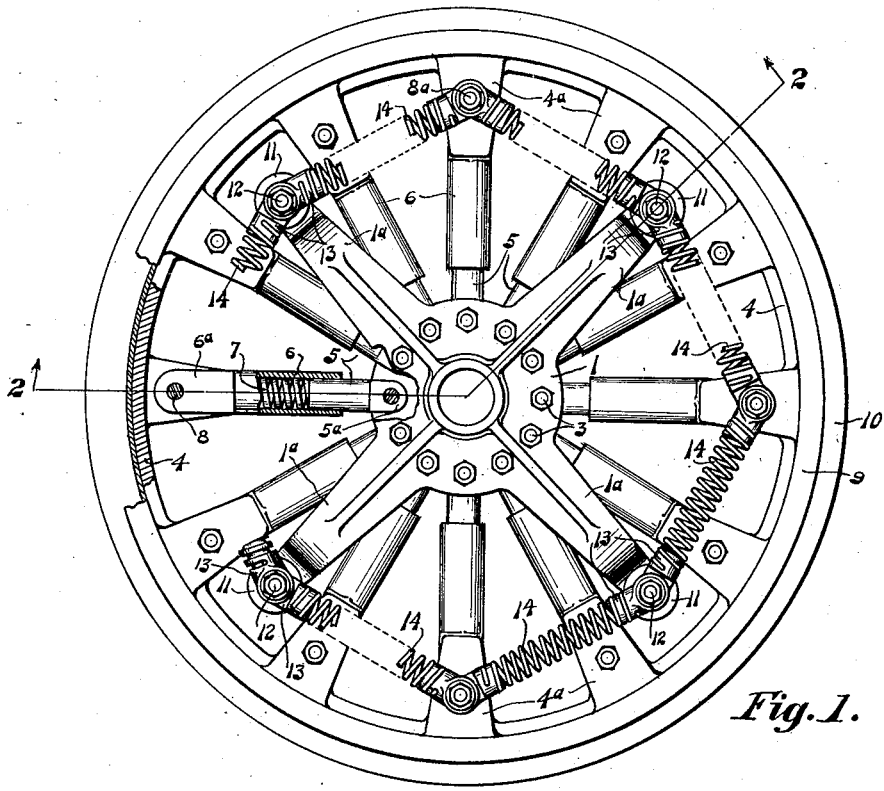
Figure 2:
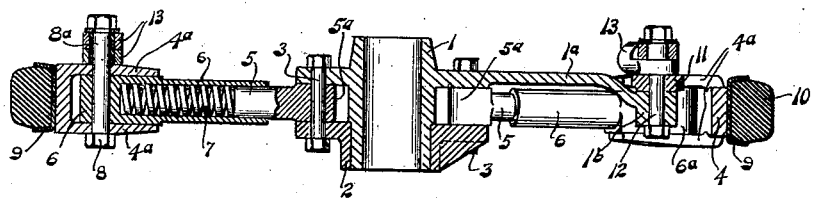

Referring to the drawings, forming a part of this specification, Figure 1, is a side elevation of a wheel constructed in accordance with my invention, certain parts being broken away and shown in section for the purpose of clearer illustration of the parts. Fig. 2, a cross sectional view taken through line 2—2 of Fig. 1.

Similar numerals of reference designate like parts throughout all the figures of the drawings.

The improved wheel consists of a main hub or driving member 1, provided with a plurality of radially extending driving or connecting arms $1^a$, and a hub ring member 2, mounted, in the present instance, on the hub portion of the main hub 1, and connected to the latter by means of a plurality of bearing bolts 3.

The wheel felly 4, is provided about its inner periphery with a plurality of inwardly extending spoke bearing lugs $4^a$, said bearing lugs $4^a$, being arranged in pairs and preferably formed integral with the wheel felly 4, as shown most clearly in Fig. 2, of the drawings.

The wheel spokes comprise a plurality of telescoping spring resisted spoke members 5, and 6, the members 5, adjacent to the hub being provided with bearing heads $5^a$, disposed between the main hub 1, and hub ring member 2, and mounted upon the bearing bolts 3, connecting said hub members 1 and 2. The main spoke members 6, are preferably of tubular form and are adapted to receive and take over the outer ends of the spoke members 5, and also form a housing to receive the cushioning springs 7, interposed between the ends of the spoke members 5, and the base or outer ends of the main spoke members 6, said main spoke members terminating at their outer ends in bearing heads $6^a$, interposed between the bearing lugs $4^a$, and connected to the latter by means of pivot bolts 8.

The wheel felly 4, may be of any suitable and convenient form, and is provided, in the present instance, with a channeled wheel rim 9, carrying a rubber or cushion tire 10.

As a means for bracing or reinforcing the wheel as against lateral and circumferential stresses as well as limiting the circumferential movements of the hub and felly members relative to each other while the wheel is in service, the main hub member 1, is provided with the driving or connecting arms $1^a$, said arms terminating in bearing heads $1^b$, the latter being disposed between the outer spoke member 6, as shown most clearly in Fig. 2, of the drawings, and provided with stop disks 11, arranged in alinement with adjacent bearing lugs 4ª, at one side of the wheel felly and being adapted to strike or abut against said bearing lugs in case of a very extended circumferential movement between the hub and felly members or in case of the breakage of the spring tension or connecting members hereinafter described.

As a means for resiliently connecting the outer ends of the driving or connecting arms 1ª, to the outer or felly portions of the wheel, the bearing heads 1ᵇ, are provided with bearing bolts 12, said bolts 12, carrying the stop disks 11, and being provided with superposed oppositely extending bearing stud pins or stub arms 13, the latter being connected to oppositely extending spring links 14, said spring links 14, being connected, in the present instance, to said intermediate spoke bearing lugs 4ª, by means of extended portions 8ª, of the connecting pivot bolts 8, as shown in detail at the left hand side of Fig. 2, of the drawings.

From the foregoing description, taken in connection with the accompanying drawings, the operation and advantages of my invention will be readily understood.

Having thus described one of the embodiments of my invention, what I claim and desire to secure by Letters Patent is,—

1. A resilient vehicle wheel, comprising hub, hub ring and felly members, spring resisted telescoping spoke members pivotally connected to said hub, hub ring and felly members, connecting arms extending from said hub member and terminating near said felly member, stop members for limiting the circumferential movements of said hub and felly members relative to each other, and circumferentially arranged spring link members pivotally connected to said connecting arms and said felly member.

2. In a resilient vehicle wheel, the combination with a felly member provided with spoke bearing lugs, a plurality of spoke members, pivot bolts connecting the latter to said bearing lugs some of said bolts projecting at the sides of said lugs, and a hub member pivotally connected to said spoke members and provided with radially extending connecting arms terminating between certain of said spoke members; of a plurality of circumferentially extending spring link members connected to the outer ends of said connecting arms and said projecting pivot bolts.

In testimony whereof I have affixed my signature in presence of two witnesses.

CHARLES J. MALINGS.

Witnesses:
EMILY L. ALDRICH,
EDWARD L. SHAW.

---

Copies of this patent may be obtained for five cents each, by addressing the "Commissioner of Patents, Washington, D. C."